(12) United States Patent
Strowitzki

(10) Patent No.: US 6,714,576 B2
(45) Date of Patent: Mar. 30, 2004

(54) EXCIMER LASER AND METHOD OF OPERATING AN EXCIMER LASER

(75) Inventor: Claus Strowitzki, Gilching (DE)

(73) Assignee: TuiLaser AG, Germering (DE)

( * ) Notice: Subject to any disclaimer, the term of this patent is extended or adjusted under 35 U.S.C. 154(b) by 0 days.

(21) Appl. No.: 09/940,751

(22) Filed: Aug. 28, 2001

(65) Prior Publication Data

US 2002/0048303 A1 Apr. 25, 2002

(51) Int. Cl.[7] ................................................ H01S 3/22
(52) U.S. Cl. .......................... 372/57; 372/38.1; 372/86; 372/38.02; 372/38.07
(58) Field of Search .......................... 372/38, 125, 86, 372/37, 57, 58, 38.02, 38.07

(56) References Cited

U.S. PATENT DOCUMENTS

| | | | | |
|---|---|---|---|---|
| 4,308,507 A | * | 12/1981 | Pleasance et al. | ............ 372/38 |
| 4,709,373 A | * | 11/1987 | Scott et al. | .................. 372/86 |
| 4,847,854 A | * | 7/1989 | Van Dijk | .................... 372/107 |
| 5,267,253 A | * | 11/1993 | Nakatani | ..................... 372/38 |
| 5,313,487 A | * | 5/1994 | Fujikaswa et al. | ............ 372/87 |
| 5,754,579 A | * | 5/1998 | Mizoguchi et al. | ........... 372/58 |
| 2002/0048303 A1 | * | 4/2002 | Strowitzki | .................... 372/57 |

* cited by examiner

*Primary Examiner*—Leon Scott, Jr.
(74) *Attorney, Agent, or Firm*—Mintz, Levin, Cohn, Ferris, Glovsky and Popeo, P.C.

(57) ABSTRACT

The present invention relates to an excimer laser comprising a charging circuit including a parallel connection of a storage capacitor ($C_B$) with a series connection of a reoscillation inductance ($L_B$), a charging inductance ($L_L$) and a firing device (Z) for firing the excimer laser, wherein the storage capacitor ($C_B$) has at least a terminal for connecting a power supply ($U_L$), a peaking capacitor ($C_P$) connected in parallel with the charging inductance ($L_L$), a discharge path including two opposed electrodes (E1, E2), connected in parallel with the peaking capacitor ($C_P$), and a driving device for driving the firing device (Z), wherein the firing device (Z) is formed as a MOSFET array. The invention also relates to a corresponding method of operating such an excimer laser.

21 Claims, 3 Drawing Sheets

EXCIMER LASER AND METHOD OF OPERATING AN EXCIMER LASER

The present invention relates to an excimer laser comprising a charging circuit including a parallel connection of a storage capacitor with a series connection of a reoscillation inductance, a charging inductance and a firing device for firing the excimer laser, wherein the storage capacitor has at least a terminal for connecting a power supply, a peaking capacitor connected in parallel with the charging inductance, a discharge path including two opposed electrodes, connected in parallel with the peaking capacitor, and a driving device for driving the firing device. Furthermore, it relates to a method of operating such an excimer laser, in which first the storage capacitor is charged from the power supply, and subsequently the firing device is driven such that this one changes to a conducting state to fire the excimer laser.

Excimer lasers as well as methods of operating excimer lasers known from the prior art. The assicieted circuit diagrams are shown in FIG. 1 and FIG. 2 in schematic view.

First, referring to FIG. 1: The excimer laser, the circuit diagram of which is shown in FIG. 1, comprises a storage capacitor $C_B$, preferably realized as a capacitor bank including a plurality of single capacitors, as well as a reoscillation inductance $L_B$ in serial arrangement thereto. A charging circuit results from the both mentioned devices $C_B$ and $L_B$ as well as from a charging inductance $L_L$ arranged in series thereto, wherein the storage capacitor $C_B$ is charged from a current source $I^L$. A peaking capacitor $C_P$ as well as a discharge path having two opposed electrodes E1 and E2 are arranged in parallel with the charging inductance $L_L$. A thyratron having a control input A is arranged in parallel with the current source $I_L$ as a firing device Z. In operation of the excimer laser according to FIG. 1, for a single pumping operation of the laser, first the storage capacitor $C_B$ is charged from the current source IL, wherein the charging current flows through the storage capacitor CB, the reoscillation inductance $L_B$ as well as the charging inductance $L_L$. Subsequently, by appropriately driving the input A of the thyratron Z the laser is fired, whereby the charge stored on the storage capacitor $C_B$ is transferred to the peaking capacitor $C_P$ to a high degree. This reoscillation results in a voltage arising between the two electrodes E1 and E2, which is high enough to initiate the pumping process of the laser. The reoscillation inductance $L_B$ is composed of parasitic inductances of the single capacitors of the storage capacitor $C_B$ as well as an optional, additional discrete inductance which, in view of the resonant circuit resulting from the storage capacitor $C_B$, the peaking capacitor $C_P$ and the reoscillation inductance $L_B$, is to be dimensioned such that the reoscillation, i.e. the charge of the peaking capacitor $C_P$, is effected within about 100 ns. A slower reoscillation would result in reduction of the efficiency, a faster reoscillation would result in an unnecessarily high stress of the devices as a result of the higher currents flowing.

Due to technology, in firing only a maximum of 80% of the charge stored on the storage capacitor $C_B$ can be transferred to the peaking capacitor $C_P$. In cooperation with the thyratron Z as the firing device the following disadvantages result: first, it has to be pointed out that the fall time, i.e. the time until a thyratron changes from the non-conducting to the conducting state after appropriately driving via the input A, is about 10 ns. However, inherently a thyratron cannot defined be switched to a non-conducting state by appropriately driving. Rather, the residual energy stored on the storage capacitor $C_B$ oscillates back to the firing device, and there generates a current $I_Z$ whose time behavior is shown in FIG. 4. This current oscillates as useless energy into the laser head, i.e. it flows onto the electrodes E1 and E2, respectively, but there it does not result in laser radiation any longer, since the gas is already degenerated at this time. Rather, thereby burn-off and wear at the electrodes E1 and E2 are caused, resulting in frequent exchange of the electrodes—approximate lifetime about one milliard of pulse operations. Namely, since the conditions for a volume discharge are not given any longer, the energy explodes in discrete localized sparks. Because of the long recombination time inherent to a thyratron, repetition rates of the pulse operation can only be achieved on the order of about 300 Hz. A further disadvantage is the high standby power dissipation of a thyratron, which typically is 200 W.

In the further excimer laser known from the prior art, the circuit diagram of which is schematically shown in FIG. 2, the devices corresponding to devices of FIG. 1 are designated by the same reference symbols and are not described again. In the excimer laser according to FIG. 2 the storage capacitor $C_B$ is arranged in parallel with a current source $I_L$ to which the reoscillation inductance $L_B$ and the firing device Z are connect in series. Again, a peaking capacitor $C_P$ is arranged in parallel with this. The peaking capacitor $C_P$ is followed by three pulse compression stages, each comprising an inductance (L1, L2, L3) and a capacitor (C1, C2, C3), after which the discharge path with the electrodes E1 and E2 and the charging inductance $L_L$, arranged in parallel with this, follow. In the circuit diagram shown in FIG. 2 the firing device is realized by a thyristor or an IGBT (insulated gate bipolar transistor). The fall time of a thyristor is higher than 500 ns, the opening time, i.e. the time it takes for a thyristor to change from the conducting to the non-conducting state, is more than 20 $\mu$s. Therefore, a reoscillation operation typically takes between three and ten $\mu$s. This reoscillation would be too slow to initiate a pumping operation, since in the meantime the charge carriers would already recombine again in the preionization of the laser. Therefore, in using a thyristor or IGBT as a firing device, it is necessary to compress the firing pulse, i.e. to shrink it in time. Referring to FIG. 5, in which the time behavior of the current $I_Z$ is shown (solid line), it is apparent that per compression stage a compression with the factor of 4 is realizable (dashed lines). Due to the shorter recombination time of a thyristor or IGBT, repetition rates of the pulse operation up to 5 kHz can be realized. However, on the one hand the inclusion of pulse compression stages implies a considerable effort. On the other hand, due to many transfers of charge for the pumping process, at the end only about 50% of the energy originally stored on the storage capacitor $C_B$ are available for the pumping process.

Both excimer lasers described in conjunction with FIG. 1 and FIG. 2 have furthermore the disadvantage that the capacitor $C_B$ has to be charged from an expensive current source. The cause for this is that after firing and the subsequent recombination of the firing device, the storage capacitor $C_B$ is substantially discharged, and connecting the storage capacitor $C_B$ to a voltage source, which would be cheaper, would result in destruction of the storage capacitor $C_B$.

Therefore, the object of the present invention is to develop an excimer laser of the type mentioned at the beginning and to develop the method mentioned at the beginning, respectively, such that the storage capacitor can be charged via a cheap voltage source.

This object is achieved in that in the generic excimer laser the firing device is formed as a MOSFET array. In the method according to the invention the object is achieved in that in a further step the firing device is driven such that this one changes to a non-conducting state.

The invention is based on the idea that in using a MOSFET array the firing device can actively be shut off again, i.e. that it is not required to wait for all charge carriers not used in the discharge to have recombined, until a new charging and firing operation can be initiated, as is in the prior art. Rather, in using a MOSFET array the storage capacitor $C_B$ can be dimensioned great such that the energy required for firing corresponds only to a fraction of the charge stored on the storage capacitor $C_B$. With a MOSFET array as a firing device this one can actively be brought to the non-conducting state by appropriately driving, thereby preventing further leakage of charge from the storage capacitor $C_B$. Since according to that, after firing a substantial charge amount is contained in the storage capacitor $C_B$, recharging the storage capacitor $C_B$ by a voltage source does not result in destruction thereof. In preferred embodiments the storage capacitance of the storage capacitor $C_B$ is more than five times, preferably more than ten times the discharge amount required for a discharge operation.

A plurality of further advantages result from the use of a MOSFET array: by the defined, i.e. controlled, shut off of the MOSFET array, i.e. the change from the conducting to the non-conducting state, so-called post-currents, as mentioned in conjunction with FIG. 4, can be avoided. Burn-off and wear of the electrodes are therefore substantially reduced. This results in an increased lifetime of an excimer laser according to the invention. As a result of the very short fall time and the very short opening time, which are both on the order of 20 ns, substantially higher repetition rates can be achieved than in the excimer lasers known from the prior art. In reducing the energy not used for the laser discharge, as well as by avoiding pulse compression, about 90% of the energy drawn from the storage capacitor $C_B$ is used for the pumping process. Another significant advantage results as follows: Because a MOSFET array allows the defined shut-off of the charge removal from the storage capacitor $C_B$, a voltage overshoot at the peaking capacitor $C_P$ can be achieved. This is due to resonances resulting from oscillations as a result of the shut-off operation, which cause that especially a voltage doubling can be achieved, which is suitably used by the peaking capacitor $C_P$. As a result of this voltage doubling the output voltage of the voltage source serving for charging the storage capacitor $C_B$ can be reduced to half. This results in further substantial cost savings, not only because of the lower requirement on the voltage source, but also because of the lower requirement on the firing device, i.e. the MOSFET array, with respect to the dielectric strength.

Preferred MOSFET transistors are for example the APT10050B2LC type of Advanced Power Technology, the DE-375X2 102N20 of Direct Energy Incorporated, as well as the IXFK24N100 of IXYS.

In order to be able to switch an energy of 0,5 J within a time of 100 ns for an excimer laser 20 mJ KrF*, in a preferred embodiment a MOSFET array with about 120 MOSFETs was necessary. The voltage source supplied a voltage of 8 kV, the capacitance of the peaking capacitors was 8 nF, the dielectric strength was twice 8 kV (=16 kV). The storage capacitor $C_B$ had a capacitance of 32 nF, the reoscillation inductance was 130 nH, so that a current of 2 kA resulted during the reoscillation operation.

In a preferred embodiment, an auxiliary inductance is connected in series with the firing device, which is dimensioned such that after firing the excimer laser a delay of reoscillation of charge stored on the storage capacitor $C_B$ to the peaking capacitor $C_P$ can be effected in a predetermined time period. Especially, this is achieved in that the auxiliary inductance has a core and is dimensioned such that the core, after the predetermined time period after firing the excimer laser, goes into saturation and thereby the value of the auxiliary inductance collapses, i.e. becomes negligible small. As a result of this, immediately after firing, first a small current flows due to the common effect of the reoscillation inductance and the auxiliary inductance. This one gradually increases, wherein after exceeding a certain value, the core of the auxiliary inductance goes into saturation, and thereby the auxiliary inductance becomes considerably smaller than the reoscillation inductance. Only then, the flow of a high reoscillation current is allowed. Thereby it is achieved that first a proper switching operation of the firing device occurs, i.e. without current flowing already upon partially closing the switch, and only after completing the switching operation a current flow is allowed. This results in a delay of the current increase across the firing device and thereby facilitates the change from the conducting state to the conducting state. Thereby the lifetime of the MOSFET array is increased and the power dissipation of the entire laser is reduced. The plurality of MOSFET arrays are preferably arranged on a planar surface.

In a preferred embodiment the driving circuit for driving the firing device is adapted to drive the firing device such that this one changes to a conducting state for firing the excimer laser, and further such that this one changes to a non-conducting state at the time at which the voltage across the peaking capacitor reaches its maximum. By this measure, no specific circuits have to be provided to prevent back-oscillation of the energy. Since at a capacitor, current and voltage are 90° out of phase, the voltage maximum is correlated with a current minimum. Thus, the maximum voltage at the peaking capacitor is associated with a current minimum, wherein exactly at the current minimum no back-oscillation of energy occurs. Preferably the mentioned time is determined by measurement, and a timer in the driving circuit is appropriately set.

Further advantageous developments of the invention are defined in the dependent claims. In the following, an embodiment is described more detailed with reference to the appended drawings, wherein:

In FIG. 3, the circuit diagram of an excimer laser according to the invention is shown in schematic view, wherein devices corresponding to those of the excimer lasers of FIG. 1 and FIG. 2 bear the same reference symbols and are not explained once again.

Here, the storage capacitor $C_B$ is charged from a voltage source $U_L$. This one preferably has a soft start mode, wherein upon turning on the excimer laser and thereby with completely uncharged storage capacitor $C_B$, first it provides a current limitation to charge the storage capacitor $C_B$ up to the voltage $U_L$. After the soft start the current limitation is disabled and the storage capacitor is charged via the voltage source $U_L$. Such a voltage source can be realized very cheap compared to current sources.

A MOSFET array is arranged in series with the reoscillation inductance $L_B$ as the firing device Z of the excimer laser, which can be switched from the non-conducting to the conducting state and vice versa, via an input A to which a driving device (not shown) is connectable. An auxiliary inductance $L_H$ is connected in series with the firing device Z, which is dimensioned such that after firing the excimer laser a current delay of preferably 20 ns can be effected. Preferably, this is realized in that the auxiliary inductance $L_H$ has a core which is dimensioned such that it goes into saturation after a predetermined time period after firing the excimer laser, and thereby the value of the auxiliary inductance becomes negligible small. Thereby the high current flow associated with the reoscillation of the charge from the storage capacitor $C_B$ to the peaking capacitor $C_P$ is only enabled when the switches of the firing device, i.e. the MOSFETs of the MOSFET array, have completely changed to the conducting state. After the auxiliary inductance $L_H$ the parallel connection of the peaking capacitor $C_P$, the discharge path with the electrodes E1 and E2 as well as the charging inductance $L_L$ follows.

Because the MOSFET array consists of the parallel connection of a plurality of single MOSFETs connected in series, the single MOSFETs are loaded with a relatively low voltage, resulting in high reliability and high lifetime.

Figure 1:
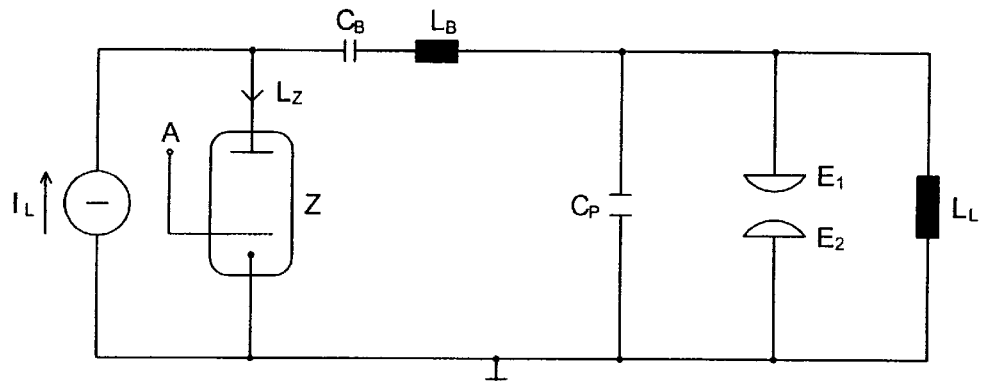
FIG. 1 shows an excimer laser known from the prior art, having a thyratron as the firing device.
Figure 2:
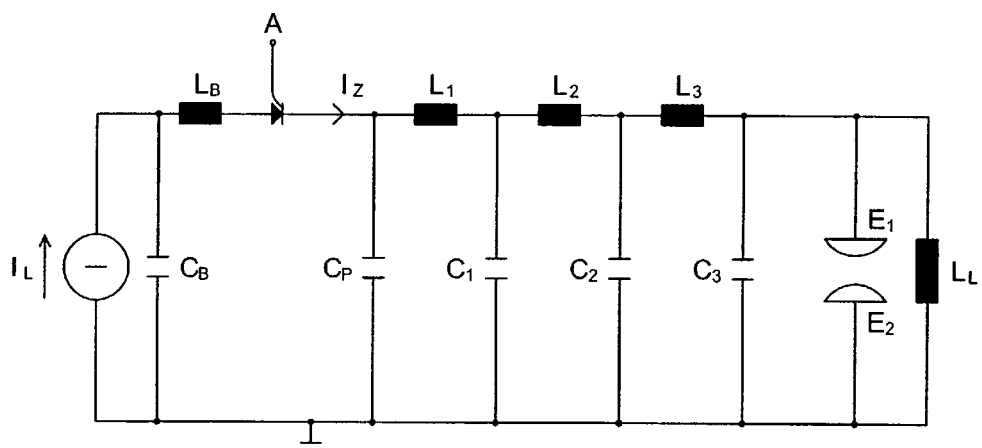
FIG. 2 shows an excimer laser known from the prior art, having a thyristor as the firing device.
Figure 3:
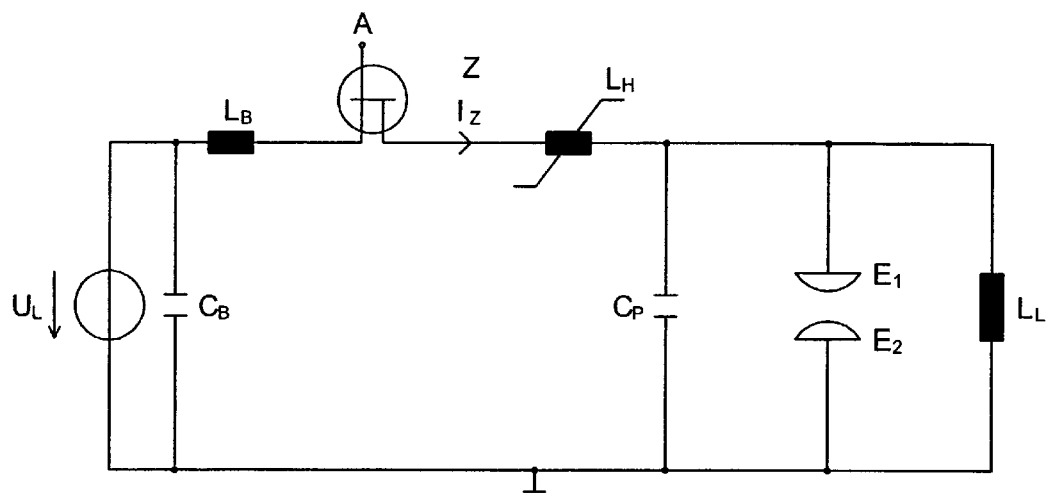
FIG. 3 shows an excimer laser according to the invention, having a MOSFET array as the firing device.
Figure 4:
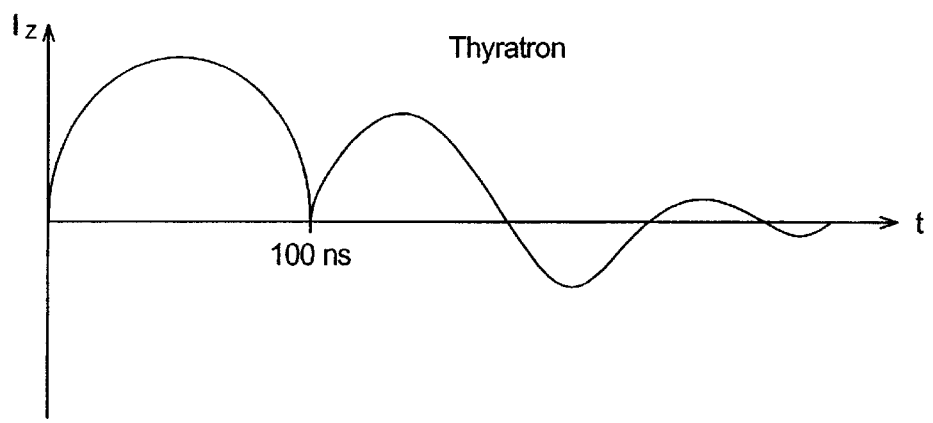
FIG. 4 shows the time behavior of the current $I_Z$ through the firing device Z in the excimer laser according to FIG. 1.
Figure 5:
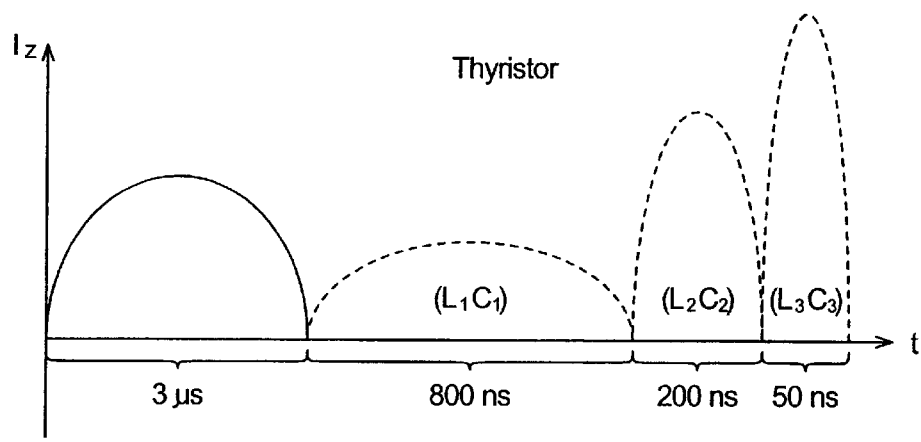
FIG. 5 shows the time behavior of the current $I_Z$ through the firing device Z in the excimer laser according to FIG. 2.
Figure 6:
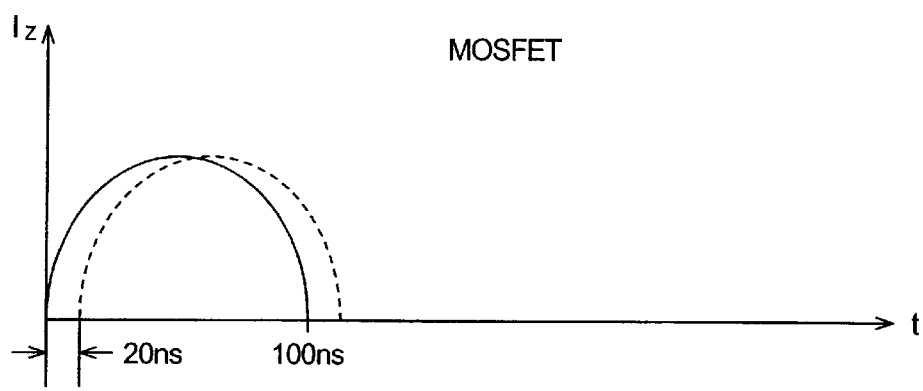
FIG. 6 shows the time behavior of the current $I_Z$ through the firing device Z in the inventive excimer laser according to FIG. 3.

FIG. 6 shows in solid line the time behavior of the current $I_Z$ through the MOSFET array without auxiliary inductance $L_H$, as well as in dashed view the behavior shifted by 20 ns with the use of an appropriately dimensioned auxiliary inductance $L_H$. Further, it is apparent from FIG. 6 that with the use of a MOSFET array no considerable post-current occurs.

For driving the MOSFET array via the input A a high voltage resistant dc isolation is necessary, because the MOSFETs are at least for a short time subjected to high voltage. On the other hand, it has to be ensured that the MOSFETs are coupled very closely to feed the control signal very quickly to the MOSFETs. For this purpose the control signals can be transferred through optical waveguides and preferably directly be transferred by means of a pulse transformer.

Such a pulse transformer can be realized very simple for the present application purpose because of the short pulse duration. Especially, only one winding on the primary and secondary sides is necessary. As a core, for example, a ring core having a size of 30 mm can be used. The isolation can be ensured via a high-voltage cable as the primary winding. Preferably, the primary sides of the transformers are connected in series. On the one hand, this results in a very simple construction, on the other hand, upon turning on, the single MOSFETs are synchronized via the internal capacitances in the MOSFETs.

What is claimed is:

1. An excimer laser, comprising:
    a charging circuit including a parallel connection of a storage capacitor ($C_B$) with a series connection of a reoscillation inductance ($L_B$), a charging inductance ($L_L$) and a firing device (Z) for firing the excimer laser, wherein the storage capacitor ($C_B$) has at least a terminal for connecting a power supply ($U_L$) and the firing device includes a MOSFET array,
    a peaking capacitor ($C_P$) connected in parallel with the charging inductance ($L_L$),
    a discharge path including two opposed electrodes (E1, E2), connected in parallel with the peaking capacitor ($C_P$), and
    a driving device for driving the firing device (Z).

2. An excimer laser according to claim 1, wherein at least one of the storage capacitor ($C_B$) and the peaking capacitor ($C_P$) includes a plurality of capacitors.

3. An excimer laser according to claim 1, wherein an auxiliary inductance ($L_H$) is connected in series with the firing device (Z), wherein the auxiliary inductance ($L_H$) is dimensioned such that after firing the excimer laser a delay of reoscillation of charge stored on the storage capacitor ($C_B$) to the peaking capacitor ($C_P$) is effected in a predetermined time period.

4. An excimer laser according to claim 3, wherein the auxiliary inductance ($L_H$) has a core configured and dimensioned to go into saturation, with a corresponding inductance substantially smaller than the reoscillation inductance, after the predetermined time period after firing the excimer laser.

5. An excimer laser according to claim 4 wherein at least one of more than five times, and more than ten times, more charge is storable with the storage capacitor than is required for the charge of the peaking capacitor for a firing operation.

6. An excimer laser according to claim 1, wherein the plurality of MOSFETs of the MOSFET array are arranged on a planar surface.

7. An excimer laser according to claim 1, wherein with the storage capacitor ($C_B$) more charge is storable than is required for the charge of the peaking capacitor ($C_P$) for a firing operation.

8. An excimer laser according to claim 7, further comprising a voltage source power supply ($U_L$) connected to the storage capacitor ($C_B$).

9. An excimer laser according to claim 1, wherein the ratio between the storage capacitor ($C_B$) and the peaking capacitor ($C_P$) is such that the voltage being applied to the peaking capacitor ($C_P$) after reoscillation is higher than the voltage having been applied to the storage capacitor ($C_B$) before reoscillation.

10. An excimer laser according to claim 8 the voltage being applied to the peaking capacitor after reoscillation is approximately double the voltage having been applied to the storage capacitor before reoscillation.

11. An excimer laser according to claim 1, wherein the driving circuit for driving the firing device (Z) is configured to drive the firing device (Z) so that the firing device changes to a conducting state for firing the excimer laser, and to drive the firing device (Z) so that the firing device changes to a non-conducting state, at the time at which the voltage across the peaking capacitor ($C_P$) reaches its maximum.

12. A method of operating an excimer laser that includes a power supply, a storage capacitor, a peaking capacitor, and a MOSFET firing device, the method comprising:
    charging the storage capacitor using the power supply while the driving device is in a non-conducting state,
    changing the MOSFET firing device to a conducting state to couple the storage capacitor and the peaking capacitor to cause the storage capacitor to transfer charge to the peaking capacitor, and
    changing the MOSFET firing device to the non-conducting state before the storage capacitor fully discharges.

13. The method of claim 12 wherein the firing device is changed to the nonconducting state when the storage capacitor has transferred at least one of approximately 10 percent of its charge and approximately 20 percent of its charge.

14. The method of claim 12 wherein charging the storage capacitor includes transferring charge from a voltage source.

15. The method of claim 14 wherein the voltage source substantially continuously transfers charge to the storage capacitor.

16. The method of claim 12 wherein the storage capacitor transfers charge to the peaking capacitor while the firing device is in the conducting state to cause an overshoot of a voltage of the peaking capacitor.

17. The method of claim 16 wherein the storage capacitor transfers charge to the peaking capacitor while the firing device is in the conducting state to cause voltage of the peaking capacitor after the transfer to be about twice the voltage of the peaking capacitor before the transfer.

18. The method of claim 12 wherein at least one of changing the firing device to the conducting state and changing the firing device to the non-conducting state occur in on the order of 20 ns.

19. The method of claim 12 further comprising repeatedly changing the firing device to the conducting state and to the non-conducting state while substantially avoiding compression of durations in which the firing device is in the conducting state.

20. The method of claim 12 further comprising delaying substantial current flow through the firing device upon changing from the non-conducting state to the conducting state.

21. The method of claim 12 wherein changing the firing device to the non-conducting state occurs when a voltage of the peaking capacitor is at about a maximum.

* * * * *